Dec. 13, 1938.  J. H. LONSKEY  2,140,323
WOODWORKING MACHINE
Filed Aug. 6, 1936   2 Sheets-Sheet 1

Inventor
John H. Lonskey
BY
Parker, Carlson, Pitney & Hubbard
Attorneys.

Dec. 13, 1938.  J. H. LONSKEY  2,140,323
WOODWORKING MACHINE
Filed Aug. 6, 1936   2 Sheets-Sheet 2
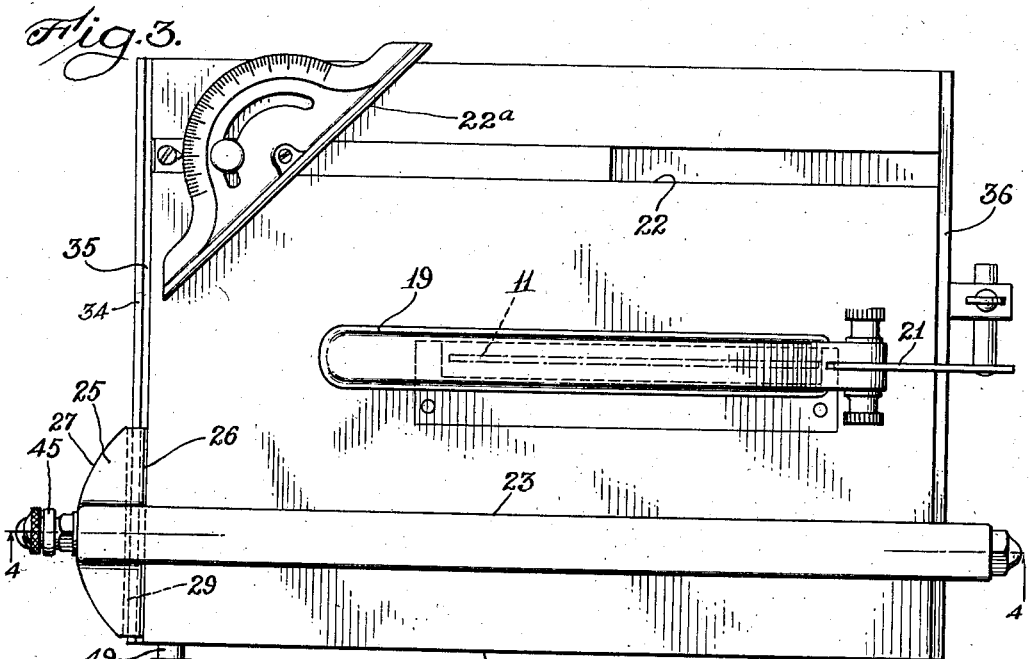
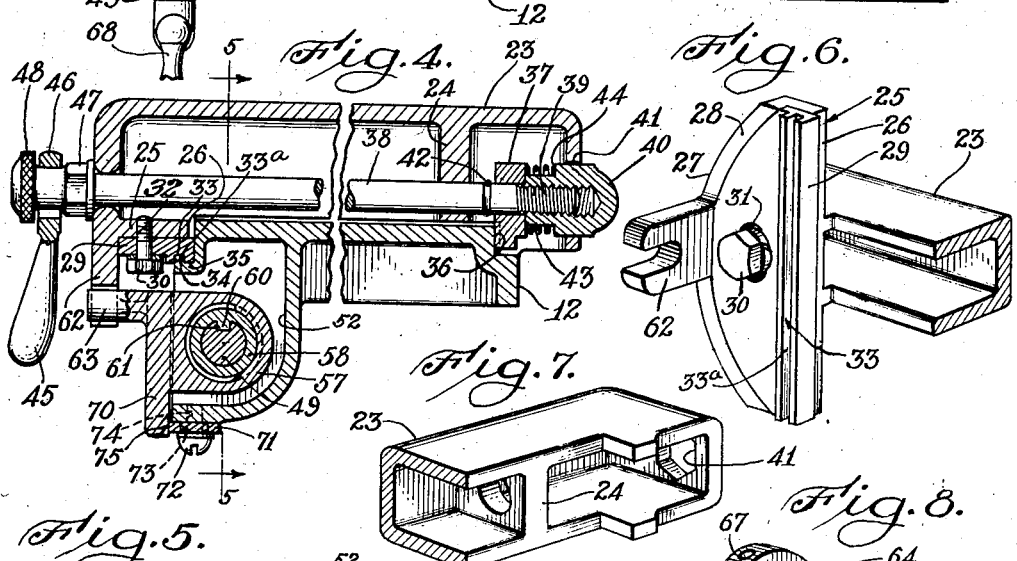
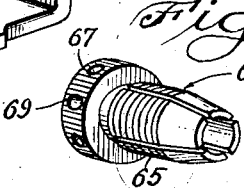
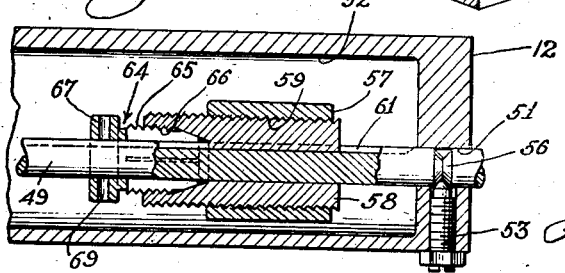
Inventor
John H. Lonskey
BY Parker, Carlson, Pitney & Hubbard
Attorneys.

Patented Dec. 13, 1938

2,140,323

UNITED STATES PATENT OFFICE 2,140,323

WOODWORKING MACHINE

John H. Lonskey, Ypsilanti, Mich., assignor to Central Specialty Co., Ypsilanti, Mich., a corporation of Michigan Application August 6, 1936, Serial No. 94,609

7 Claims. (Cl. 143—174)

My invention relates to wood working machines and in particular to fences and adjusting mechanisms therefor, of the type used with circular saws, jointers, and similar machines.

An object of my invention is to provide a wood working machine having a work-receiving table, a work-guiding fence, and an improved arrangement for quickly and accurately adjusting the position of the fence with respect to the table and the cutting tool of the machine which is simple in construction and requires a minimum number of accurately machined parts.

Another object of my invention is to provide a wood working machine having a work-receiving table, a work-guiding fence and an improved arrangement which facilitates rapid movement of the fence into the approximate position desired and by means of which the fence may then be moved more slowly and accurately to the precise position desired.

Another object of my invention is to provide a wood working machine having a work-receiving table, a work-guiding fence and an improved arrangement for maintaining the fence in a predetermined angular relation with respect to the cutting tool of the machine while moving the same transversely across the table.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawings in which, Fig. 1 is a side elevation of a bench-type circular saw, embodying my invention.

Fig. 2 is an end elevation of the circular saw shown in Fig. 1.

Fig. 3 is a plan view of the circular saw shown in Fig. 1.

Fig. 4 is an enlarged longitudinal sectional view along the line 4—4 in Fig. 3 of the fence and adjusting mechanism therefor, the central portion of the fence being broken away.

Fig. 5 is an enlarged sectional view along the line 5—5 in Fig. 4 of the adjusting mechanism for moving the fence transversely across the table.

Fig. 6 is a fragmentary perspective view of the front end portion of the fence.

Fig. 7 is a fragmentary perspective view of the rear end portion of the fence.

Fig. 8 is a perspective detailed view of the split collar included in the transverse fence adjusting mechanism best shown in Fig. 5.

Referring to the drawings, I have shown in Fig. 1 a circular saw of the bench-type, embodying my invention, although it will be understood that my invention is not limited thereto since it may be readily applied to various other types of wood working machines. The particular machine illustrated is provided with a base frame 10 having a circular saw 11 journaled thereon for rotation in the vertical plane. A work-receiving table 12 having a substantially flat upper surface is supported on the base frame 10 by a pair of vertically movable supporting members 13. The saw 11 extends through a slot formed in the table 12. The usual mechanism is provided for adjusting the vertical and angular position of the table with respect to the saw. The vertical position of the table may be adjusted by a suitable mechanism which moves supporting members 13 up or down and which is actuated by a manual operating handle 14. The table 12 is pivotally secured to the upper ends of the supporting members 13 in such manner that it may be tilted about a horizontal axis. As shown in Fig. 1, the pivotal mounting includes a depending slotted bracket 15 which is secured to a co-operating bracket on the front supporting member 13 by a pivot pin 17. An aligned pivotal support (not shown) is provided at the rear end of the table. A manually operable clamping member 18 is provided to clamp the table in its adjusted position. A hollow guard member 19 extends over the upper portion of the saw 11 in order to protect the operator from accidental contact therewith. The rear end of the guard 19 is pivotally mounted on a pin which extends through a vertical slot 20 formed in an upright guide plate 21. As is the common practice in such machines, longitudinal grooves 22 are formed in the surface of the table 12 adapted to receive the mounting member of a miter gauge 22a.

A work-guiding fence 23 extends horizontally across the top of the table 12 and forms a lateral bearing surface against which boards or other material worked upon may be held in order to accurately position the same with respect to the saw 11. The fence 23 is rectangular in shape and is preferably hollow in order to minimize the weight of the same. The particular fence illustrated is made of die-cast aluminum, the lower side thereof being open. A series of transverse webs 24 are formed in the interior of the fence to increase the rigidity and strength thereof.

I have provided an improved arrangement for supporting the fence 23 on the table 12 in such manner that it may be readily moved transversely with respect to the table 12 and clamped in any particular desired position thereon and by means of which the angular position of the fence with respect to the transverse edge of the table may also be readily adjusted to bring it into alignment with the saw. The improved construction which I have provided also facilitates removal of the fence from the table. In general, my improved clamping and supporting arrangement for the fence 23 includes a movable clamping member and a manually operable actuating mechanism therefor, for moving the same into or out of full clamping position, as well as a tensioning arrangement for causing the clamping member to exert a predetermined minimum clamping pressure at all times. This tensioning arrangement is particularly useful in maintaining a predetermined angular adjustment of the fence during the transverse movement thereof across the table, as is described in greater detail below. In my preferred arrangement one of the clamping members which holds the fence in position on the table may be releasably clamped in various angular positions with respect to the fence so as to adjust the angular relation of the fence with respect to the table and thus position it parallel with the face of the saw even though the edge of the table is not machined exactly parallel with the shaft on which the saw is mounted.

In the particular construction illustrated, the fence 23 is provided with an integral T-shaped head including a flat plate 25 lying in a plane at right angles to the vertical plane of the main body portion of the fence and slightly below the lower edge thereof. The plate 25 has a straight inner edge 26 arranged substantially at right angles with respect to the fence and an arcuate outer edge 27. A depending flange 28 extends downwardly from the arcuate edge 27 of the plate 25. A clamping or positioning plate 29 is secured to the lower side of the plate 25 by a screw 30, which extends through an elongated slot 31 formed in the plate 29 and is threaded in a tapped hole 32 formed in the plate 25. It will be noted from an inspection of Fig. 6 that the clamping plate 29 is provided with an arcuate rear edge 34 which conforms to the curvature of the inner side of the flange 28 and an enlarged front portion having a groove 33 formed therein with a straight rear wall or edge 33ᵃ. The front edge of the clamping plate 29 extends a short distance laterally beyond the adjacent straight edge 26 of the plate 25. A transversely extending rib 34 is disposed on the front of the table in spaced relation to the forward edge of the top surface thereof and at right angles to the plane of the saw 11. The groove 33 fits over the rib 34 and the edge 33ᵃ of the groove bears against the adjacent portion of the rib, the forward portion of the plate 29 being disposed in a groove 35. It will thus be seen that the angular position of the fence 23 with respect to the table 12 may be adjusted by shifting the position of the clamping plate 29 with respect to the plate 25 and fence 23. That is, the screw 30 may be loosened and the clamping plate 29 shifted to the desired position with respect to the plate 25 and the screw 30 is then tightened to hold the clamping plate 29 rigidly in such position. Then, since the straight inner edge 33ᵃ of the clamping plate 29 is arranged to bear against the rib 34 on the table 12, as best shown in Fig. 4, the angular position of the fence 23 with respect to the table is fixed, the general arrangement being similar to that had with an adjustable T-square. The fence 23 is ordinarily arranged substantially parallel with the face of the saw 11.

A right-angle groove 36 is formed in the rear edge of the table and the rear end of the fence 23 is supported by a vertical rectangular clamping member 37 which is slidably mounted in the groove 36. The bottoms of the grooves 35 and 36 are preferably located below the bottoms of miter grooves 22 in order that the clamping members will not be caught in the ends of these grooves.

The clamping member 37 is slidably mounted on a shaft 38 which extends longitudinally through the fence 23, being journaled in suitable holes formed in the front end wall thereof and in the webs 24. The shaft 38 is provided with threads 39 on the rear end portion thereof which are threaded in a tapped hole formed in a bushing 40, which is provided with a hexagonal head slidably mounted in a hexagonal hole 41 formed in the rear end wall of the fence 23 and which prevents rotation thereof. Thus, rotation of the shaft 38 causes it to be screwed into or out of the bushing 40 and the latter is thus moved longitudinally with respect to the fence 23 and table 12. Consequently, when the shaft 38 is rotated in such manner as to move the bushing 40 forward, the clamping member 37 is also moved forward to its full clamping position, in which it is pressed against the edge of the table 12 by the adjacent end of the bushing 40. When the shaft is rotated in the opposite direction, the adjacent end of the bushing 40 moves away from the clamping member 37 releasing it from its full clamping position. A spring 43 interposed between the clamping member 37 and a shoulder 44 on the bushing 40 exerts a predetermined minimum pressure on the clamping member, however, so that the fence 23 is held in accurate angular alignment by the clamping plate 29 and clamping member 37 even when the shaft 38 is rotated to its released position. As a result, the fence 23 is maintained accurately in its selected angular position even during transverse movement thereof across the table. A stop ring 42 secured in a groove in the shaft 38 limits the axial movement of the clamping member 37 so that the latter as well as the spring 43 are held in their assembled positions even when the fence is removed from the table.

A locking lever 45 is provided for rotating the shaft 38. The locking lever includes a socket type head 46 which may be moved to the right, as viewed in Fig. 4, into engagement with a hexagonal nut 47 secured to the shaft 38 or may alternatively be moved to the left to the position shown in Fig. 4, in which it surrounds a portion of the shaft 38 which is of less diameter than the interior of the socket. When in the position illustrated in Fig. 4, the locking lever turns loosely about the shaft 38 and its movement will not cause any movement of the shaft 38, and consequently the clamping member 37 will not be loosened by accidental contact with the locking lever 45. A disk shaped retainer 48 is welded or otherwise rigidly secured to the outer end of the shaft 38 in order to prevent removal of the locking lever 45 therefrom.

I have also provided an improved arrangement for moving the fence 23 transversely with respect to the table 12. This arrangement is similar in its broader aspects to that described and claimed in my copending application S. N. 63,060, filed February 10, 1936. In general, the improved arrangement disclosed in my present application facilitates the rapid movement of the fence to the approximate position desired and then an accurate adjustment of the same to the precise position desired. Also, the operating connection between the fence and adjusting mechanism is preferably detachable in order that the fence may be readily removed from the table without affecting the lateral adjustment mechanism. This latter feature is particularly advantageous in that the fence may be removed from the table 12 and placed on an extension table if so desired.

As best shown in Figs. 4 and 5, the lateral adjustment mechanism illustrated includes a shaft 49 which extends transversely of the table 12 and is rotatably mounted adjacent the front end of the table. The shaft 49 is loosely journaled in holes 50 and 51 arranged in the end walls of a recess 52 formed in the front end of the table 12. Longitudinal movement of the shaft 49 is prevented by a spline screw 53 engaging an annular groove 56 formed in the shaft 49. A sleeve 57 is arranged for axial movement along the shaft 49 and a releasable connection is provided between the sleeve 57 and shaft 49 by means of which the sleeve 57 may be selectively moved along the shaft without rotation of the latter or by which the sleeve may be moved slowly and accurately axially along the shaft in response to rotation of the latter.

A second sleeve or bushing 58 is threaded in a tapped hole 59 extending through the sleeve 57, being thus interposed between the sleeve 57 and the shaft 49. The bushing 58 is provided with an internal tongue or key 60 which is positioned in a longitudinal groove 61 formed in the shaft 49.

The fence 23 is detachably connected to the sleeve 57 by a depending yoke 62 formed on the plate 25 which engages a lateral projection 63 formed on the sleeve 57. It will thus be seen that the fence 23 may be moved transversely across the table 12 by sliding the sleeve 57 and bushing 58 axially along the shaft 49. The fence 23 may thus be rapidly moved to the approximate position desired on the table 12. After having been thus approximately positioned, the fence 23 may be moved to the precise position desired by rotation of the shaft 49 after the bushing 58 has been clamped thereto so that rotation of the shaft 49 will cause the bushing 58 to rotate and move the sleeve 57 axially along the same. This clamping arrangement includes a locking or wedging collar 64 having a threaded portion 65 and a tapered end which may be screwed into the tapped inner bore or recess 66 in the housing 58. As is best shown in Fig. 8 the threaded portion 65 of the locking collar 64 is split into four sections so that as the locking collar 64 is screwed into the bore 66 of the bushing 58, the latter is firmly wedged on the shaft 49. This wedging action may conveniently be had by grasping the knurled portion 67 of the locking collar 64 and then rotating the shaft 49 by a manual crank-type operating handle 68 secured thereto. A series of holes 69 have also been provided in the knurled portion 67 of the locking collar 64 so that a pin may be inserted therein to hold the locking collar while the bushing 58 is being wedged on the shaft 49.

After the bushing 58 has been so wedged on the shaft 49 the latter may be rotated by the operating handle 68 and the sleeve 57 and fence 23 thus moved to the precise position desired. During such transverse movement of the fence 23 across the table 12, the pressure exerted on the clamping member 37 by the biasing spring 43 maintains the clamping plate 29 and clamping member 37 in close contact with the adjacent edges of the table 12 so that the angular adjustment of the fence 23 is retained. This retention of the angular adjustment of the fence during transverse movement thereof is particularly advantageous when the operator desires to adjust the fence with great precision to a certain distance from the saw 11 in order to make a cut in a board at some precise distance from the edge thereof which rests against the fence. The general arrangement of the parts of the mechanism which I have provided is also particularly advantageous since all of the adjustments thereof can be readily made from the front end of the table 12. Thus, the fence 23 may be moved transversely with respect to the table by rotating the operating handle 68 and the fence may be clamped or unclamped from the table by means of the locking lever 45. Also, the clamping screw 30 for adjusting the clamping plate 29 is located at the front of the machine. Such an arrangement of the various manually adjustable levers and the like at the front of the machine not only makes the machine more convenient to operate but also increases the safety of operation. In other words, it is unnecessary for the operator to reach across the table to adjust various parts of the machine and thus, there is less likelihood of his being injured by the rapidly rotating saw 11.

The sleeve 57 is provided with a downwardly extending projection 70 which bears against an adjustable guide mounted on the lower side of the table 12 and thus prevents rotation of the sleeve 57 about the shaft 49 and helps to maintain the sleeve 57 in its adjusted axial position. The guide is preferably in the form of a rectangular steel strip or plate 71, which is detachably secured in position by a series of screws 72 passing through transverse slots 73 formed in the strip 71 and threaded in tapped holes 74 formed in the lower side of the table 12 adjacent the front edge thereof. A lateral edge 75 of the guide strip 71 extends a short distance beyond the adjacent edge of the table 12 and is carefully machined flat so as to form a smooth, straight guideway for the sleeve 57. The edge 75 of the guide strip 71 is arranged substantially in alignment with the axis of rotation of the saw 11. This general arrangement of an adjustable guide strip forming a bearing support for the mechanism used to move the fence transversely with respect to the table is described and claimed in my copending application S. N. 63,060 referred to above. This arrangement is particularly advantageous in that it minimizes the machine finishing required during the manufacture of the apparatus. Thus, it is unnecessary to accurately machine guideways or other supporting surfaces on the table itself, the only finishing required for the end of the table being that usually given to such machine parts in order to improve their general appearance. Also, the shaft 49 need not be accurately aligned with the axis of rotation of the saw 11. The friction between the sleeve 57 and bushing 58, as well as that between the projection 70 and strip 71, thus in effect clamps the sleeve 57 and fence 23 against the shaft 49 except upon deliberate manual movement thereof but no separate locking levers or the like need be provided to effect such clamping.

Although I have shown a particular embodiment of my invention in connection with a bench type circular saw, I do not desire my invention to be limited to the particular construction shown and described and I intend in the appended claims to cover all modifications within the spirit and scope of my invention.

I claim as my invention:

1. In combination with a wood working machine provided with a work-receiving table and a cutting tool, a fence extending horizontally over the table, a plate rigidly secured to said fence adjacent one end thereof, said plate being positioned in a plane substantially at a right angle with respect to said fence and parallel to the top of the table, a second plate arranged in face contact with said first named plate and having an edge abutting against a transversely extending shoulder on the table, said first named plate and said fence being movable relative to said second plate to effect angular adjustment thereof with respect to said table, and clamping means for selectively holding said first named plate and said fence in adjusted angular position with respect to the table, a rotatable shaft extending transversely of the table adjacent one end thereof, a sleeve mounted on said shaft, means including cooperating parts on said sleeve and shaft for effecting axial movement of said sleeve along said shaft upon rotation of said shaft, a manual operating handle for rotating said shaft, and means operatively connecting said first named plate and said sleeve for moving said first named plate transversely of the table when in its adjusted angular position in response to the axial movement of said sleeve along said shaft.

2. In combination with a wood working machine provided with a work-receiving table and a cutting tool, a fence extending horizontally over the table, a plate rigidly secured to said fence adjacent one end thereof, a rotatable shaft extending transversely of the table adjacent one end thereof, a sleeve mounted on said shaft, means including cooperating parts on said sleeve and shaft for effecting axial movement of said sleeve along said shaft upon rotation of said shaft, and means including a depending yoke on said plate engaging a lateral projection on said sleeve for detachably connecting said plate to said sleeve.

3. In combination with a wood working machine provided with a work-receiving table and a cutting tool, a fence extending horizontally over the table, a rotatable shaft extending transversely of the table, a sleeve surrounding said shaft, means for supporting said sleeve for free sliding movement axially along said shaft, releasable connecting means for moving said sleeve axially along said shaft in response to rotation of said shaft, means for rendering said connecting means inoperative, said sleeve being freely slidable along said shaft on said supporting means when said connecting means is inoperative, and means operatively connecting said sleeve to said fence for effecting transverse movement of said fence across the table upon axial movement of said sleeve along said shaft.

4. In combination with a wood working machine provided with a work-receiving table and a cutting tool, a rotatable shaft extending transversely of the table, an exteriorly threaded bushing slidably mounted on said shaft, a sleeve surrounding said shaft and threaded on said bushing, said sleeve being axially movable with respect to said bushing upon relative rotation thereof, means for preventing rotational movement of said sleeve about said shaft, means for releasably securing said bushing to said shaft, and means operatively connecting said sleeve to said fence for effecting transverse movement of said fence across the table upon axial movement of said sleeve along said shaft.

5. In combination with a wood working machine provided with a work-receiving table and a cutting tool, a fence extending horizontally over the table, a rotatable shaft extending transversely of the table, an exteriorly threaded bushing slidably mounted on said shaft, said bushing having a recess formed in one end thereof surrounding said shaft, a sleeve surrounding said shaft and threaded on said bushing, said sleeve being axially movable with respect to said bushing upon relative rotation thereof, means including a wedge slidably mounted on said shaft and movable into and out of said recess in said bushing for releasably securing said bushing to said shaft, and means operatively connecting said sleeve to said fence for effecting transverse movement of said fence across the table upon axial movement of said sleeve along said shaft.

6. In combination with a wood working machine provided with a work-receiving table and a cutting tool, a fence extending horizontally over the table, a rotatable shaft extending transversely of the table and having a longitudinal groove formed therein, an exteriorly threaded bushing slidably mounted on said shaft and having a tongue engaging said groove, said bushing having a threaded recess formed in one end thereof surrounding said shaft, a sleeve surrounding said shaft and threaded on said bushing, said sleeve being axially movable with respect to said bushing upon relative rotation thereof, means for preventing rotational movement of said sleeve about said shaft, means including a locking collar slidably mounted on said shaft and having a split tapered portion threaded in said recess in said bushing for releasably securing said bushing to said shaft, and means operatively connecting said sleeve to said fence for effecting transverse movement of said fence across the table upon axial movement of said sleeve along said shaft.

7. In combination with a wood working machine provided with a work-receiving table and a cutting tool, a fence extending horizontally over the table, a rotatable shaft extending transversely of the table and having a longitudinal groove formed therein, an exteriorly threaded bushing slidably mounted on said shaft and having a tongue engaging said groove, said bushing having a threaded recess formed in one end thereof surrounding said shaft, a sleeve surrounding said shaft and threaded on said bushing, said sleeve being axially movable with respect to said bushing upon relative rotation thereof, means for preventing rotational movement of said sleeve about said shaft, means including a locking collar slidably mounted on said shaft and having a split tapered portion threaded in said recess in said bushing for releasably securing said bushing to said shaft, and means including a depending yoke on said fence engaging a lateral projection on said sleeve for detachably connecting said fence to said sleeve to effect transverse movement of said fence across the table upon axial movement of said sleeve along said shaft.

JOHN H. LONSKEY.